United States Patent
Durairaj et al.

(10) Patent No.: US 6,875,807 B2
(45) Date of Patent: Apr. 5, 2005

(54) SILANE-MODIFIED PHENOLIC RESINS AND APPLICATIONS THEREOF

(75) Inventors: Raj B. Durairaj, Monroeville, PA (US); C. Michael Walkup, New Kensington, PA (US); Mark A. Lawrence, New Kensington, PA (US)

(73) Assignee: Indspec Chemical Corporation, Pittsburgh, PA (US)

( * ) Notice: Subject to any disclaimer, the term of this patent is extended or adjusted under 35 U.S.C. 154(b) by 0 days.

(21) Appl. No.: 10/446,968

(22) Filed: May 28, 2003

(65) Prior Publication Data

US 2004/0241331 A1 Dec. 2, 2004

(51) Int. Cl.$^7$ .............................................. C08L 61/04
(52) U.S. Cl. ...................... 524/502; 525/134; 525/135; 525/139; 525/141; 525/142; 525/144; 525/151; 525/480; 525/504; 525/505; 525/132; 524/506; 524/508; 528/29; 528/129; 528/155
(58) Field of Search ........................ 528/29, 129, 155; 525/480, 132, 134, 139, 141, 142, 144, 504, 505; 524/502, 506, 508

(56) References Cited

U.S. PATENT DOCUMENTS

| | | |
|---|---|---|
| 3,074,904 A | 1/1963 | Higashi |
| 4,022,753 A | 5/1977 | Lohse et al. |
| 4,051,281 A | 9/1977 | van Gils et al. |
| 4,052,524 A | 10/1977 | Harakas et al. |
| 4,236,564 A | 12/1980 | Kalafus et al. |
| 4,333,787 A | 6/1982 | Erickson |
| 4,441,946 A | 4/1984 | Sharma |
| 5,177,157 A | 1/1993 | Akamatsu |
| 5,736,619 A | 4/1998 | Kane et al. |
| 6,441,106 B1 | 8/2002 | Goda et al. |

FOREIGN PATENT DOCUMENTS

| | | | | |
|---|---|---|---|---|
| EP | 1086972 A1 | 3/2001 | | |
| EP | 1123944 A1 | 8/2001 | | |
| JP | 56155239 A | * | 12/1981 | ........... C08L/61/06 |
| JP | 2002194064 A | * | 7/2002 | ........... C08G/59/62 |

* cited by examiner

*Primary Examiner*—Jeffrey Robertson
*Assistant Examiner*—Marc S. Zimmer
(74) *Attorney, Agent, or Firm*—Jones Day

(57) ABSTRACT

A silane-modified phenolic resin is prepared by reacting a phenolic compound (e.g., resorcinol) with an aldehyde to produce a phenolic novolak resin. The phenolic novolak resin is further reacted with at least one silane compound to produce the silane-modified phenolic resin. The reaction is typically carried out in the presence of an acid or base catalyst. The resulting resin has a lower softening point and can be used as a methylene acceptor compound in a vulcanizable rubber composition.

36 Claims, No Drawings

SILANE-MODIFIED PHENOLIC RESINS AND APPLICATIONS THEREOF

PRIOR RELATED APPLICATIONS

Not applicable.

FEDERALLY SPONSORED RESEARCH STATEMENT

Not applicable.

REFERENCE TO MICROFICHE APPENDIX

Not applicable.

FIELD OF THE INVENTION

The invention relates to silane-modified phenolic resins, methods for their synthesis, and applications thereof, especially in reinforced rubber compositions.

BACKGROUND OF THE INVENTION

Rubber articles, such as tires, belts and hoses, normally use reinforcing materials such as steel, polyester, nylon, aramid and rayon in the form of fibers, cords or fabrics. In the case of radial tire production, steel cords are often used as the reinforcing material. Steel cords for tires, in general, are coated with a layer of brass to promote adhesion between the steel cords and rubber compounds. In order to improve the adhesion between rubber and steel cords, the use of a cobalt salt, such as cobalt naphthenate, and/or a phenolic adhesive composition comprising a methylene acceptor and methylene donor in the compound formulations are in current practice. The copper and zinc present in the brass coating react with sulfur to form a bonding layer, comprising sulphides of copper and zinc, between the steel cord and rubber. The formation of such sulfide layers at the interface is responsible for the initial unaged adhesion of brass plated steel and rubber. The use of cobalt salt regulates the formation and composition of copper sulfide and zinc sulfide layers. It has become common to use resorcinol or resorcinolic novolak resins as the phenolic methylene acceptor and hexamethoxymethylmelamine (HMMM) or pentamethoxymethylmelamine (PMMM) as the methylene donor in rubber compounds to improve the steel cord adhesion. On curing, the reaction product of phenolic methylene acceptor and donor form a protective moisture resistant resin coating on the bonding layer and protects the loss of adhesion during aging.

Achieving higher levels of steel cord adhesion with rubber compounds and maintaining this adhesion under various environmental conditions, such as heat, humidity and saline conditions, are important for the long term durability of tires. In the case of an unaged condition, rubber-brass adhesion exceeds the tear strength of the rubber and therefore, no bond failure occurs at the copper sulfide and rubber interface. But, under wet and salt water conditions the adhesion of steel cords fails due to corrosion. Though the cobalt salt was effective against salt water and steam-aged adhesion, the use of resorcinol or resorcinolic novolak resins, along with HMMM, has provided the highest adhesion under these conditions.

The corrosion of steel cords is due to the attack of moisture under hot and wet conditions. If this is prevented, then the corrosion of steel wire can be avoided, thereby the adhesion level can be maintained under all aged conditions of the tire. In this way the service life of the tire can be extended.

In order to avoid or minimize the steel tire cords corrosion, several approaches or methods were employed, not only in the rubber compound formulations but also with the treatment of steel cords.

In one method, steel wires were cleaned first and then coated with an amino-silane primer. Then the silane coated wires were again coated with a phenol-resorcinol-formaldehyde-latex solution before being incorporated into the rubber compound and cured. This method improved the hydrolytic stability of the bond between the steel and rubber.

In another method, the humidity-aged adhesion of brass plated steel cord to rubber was improved by dipping the cord in dilute acetic acid in methanol solution followed by a treatment with $H_2S$ gas. The cord was then combined with a vulcanizable rubber compound and cured.

Bright steel wires dipped in the adhesive compositions prepared by the mixing of phenol-formaldehyde resole and resorcinol-formaldehyde novolak solutions showed a dramatic improvement over the brass plated wires in the adhesion retention after humidity aging. The highly cross-linked phenol-resorcinol-formaldehyde network formed from the resole and novolak that coated the bright steel is responsible for the moisture resistance and improving the humidity-aged adhesion.

Improved humidity-aged adhesion between a rubber compound and bright steel was achieved when the bright steel wires were dipped first into an alcoholic solution of aminosilanes and then vulcanized with a rubber containing a phenolic novolak resin. Compared to brass-plated steel cords, the silane-treated bright steel wires retained their high adhesion values after humidity aging.

The application of silanes and hydrolyzed silanes on the surface of reinforcing tire cords such as stainless steel, galvanized steel, tin, zinc or brass plated steel are known to prevent the corrosion of these metals. On hydrolysis, these silanes produce silanol groups which are active towards the hydroxyl or oxide groups present on the surface of these metals. The silanol groups react themselves producing Si—O—Si bonds on the metal surface and are more stable and hydrophobic. This makes the silane-treated metal surfaces more resistant to moisture and corrosive attack. Though this method provides a solution to prevent the corrosion of steel cords, the use of highly flammable solvents to dissolve these silanes, their applications onto these metal surfaces, and handling thereof can be an environmental hazard.

Therefore, there is a need for a new phenolic resin that can be handled and used relatively safely in rubber compound formulations and, in the meantime, improves the unaged, heat-, and humidity-aged adhesion of a brass-plated steel cords to cured rubber compounds.

SUMMARY OF THE INVENTION

The aforementioned need is fulfilled by various aspects of the invention. In one aspect, the invention relates to a silane-modified phenolic resin prepared by a process comprising reacting a phenolic novolak resin with a silane or a mixture of silane compounds. Such silane compounds are represented by Formula (C), (D), or (E):

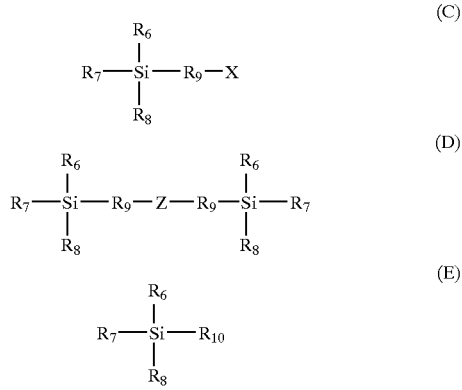

wherein $R_6$, $R_7$ and $R_8$ are independently an alkyl group of 1 to 4 carbon atoms, an alkoxy group of 1 to 8 carbon atoms, phenyl group, or cycloalkyl group; $R_9$ is a divalent saturated or unsaturated aliphatic straight or branched hydrocarbon group with 1 to 12 carbon atoms; X is a thiol, amino, isocyanato, urea or glycidylether group; Z is $S_x$ or an NH group wherein x is 1, 2, 3, 4, 5, 6, 7, or 8; and $R_{10}$ is a vinyl group or an alkoxy group. In some embodiments, no substantial amount of siloxane polymer is formed during the reaction to make the silane-modified phenolic resin. In other embodiments, the silane-modified phenolic resin is substantially free of cross-linking. In some embodiments, the ratio of the number of equivalents of alkoxy groups in the silane compound to the number of equivalents of phenolic hydroxyl groups in the phenolic novolak resin is less than 1, less than 0.1, or less than 0.01. In other embodiments, the silane-modified phenolic resin is not further hydrolyzed.

The phenolic novolak resin is obtained by reacting one or more phenolic compounds represented by formula (A) with one or more aldehyde or ketone compounds:

(A)

wherein $R_1$, $R_2$, $R_3$, $R_4$ and $R_5$ represent independently an organic group selected from hydrogen, hydroxyl, an alkyl having 1 to 15 carbon atoms, an aralkyl of having 8 to 12 carbon atoms, halogen, or an amino group. For example, the phenolic compound can be a phenol, alkyl substituted phenol, aralkyl substituted phenol, or a mixture of phenol and alkyl or aryl substituted phenol. It can also be a resorcinol or alkyl substituted resorcinol or an aralkyl substituted resorcinol. Examples of the aldehyde include, but are not limited to, formaldehyde, acetaldehyde, propionaldehyde, butyraldehyde, iso-butyraldehyde, n-valeraldehyde, benzaldehyde, crotonaldehyde, cinnamaldehyde, or mixtures thereof.

Examples of the phenolic novolak resin include, but are not limited to, phenol-formaldehyde novolak, phenol-alkylphenol-formaldehyde novolak, phenol-aralkylphenol-formaldehyde novolak, high ortho phenol-formaldehyde novolak, phenol-resorcinol-formaldehyde novolak, alkylphenol-resorcinol-formaldehyde novolak, aralkylphenol-resorcinol-formaldehyde novolak, resorcinol-formaldehyde novolak, alkylresorcinol-formaldehyde novolak, alkylresorcinol-resorcinol-formaldehyde novolak, aralkylresorcinol-resorcinol-formaldehyde novolak, and mixtures thereof.

Examples of suitable silanes include, but are not limited to, 3-(aminopropyl)-triethoxysilane, 3-(isocyanatopropyl) triethoxysilane, 3-(glycidyloxypropyl)trimethoxysilane, 3-(mercaptopropyl)trimethoxysilane, N-beta-aminoethyl-3-(aminopropyl)trimethoxysilane, 3-(aminopropyl) trimethoxysilane, 3-(aminoethyl)triethoxysilane, 3-(glycidyloxyethyl)-triethoxysilane, 3-(mercaptopropyl) triethoxysilane, N-beta-aminoethyl-3-(aininoethyl)-trimethoxysilane, 3-(aminobutyl)triethoxysilane, (aminoethyl)trimethoxysilane, 3-(amino-propyl) methyldiethoxysilane, N-(3-(triethoxysilyl)propyl)urea, 3,3'-bis(trimethoxysilylpropyl)disulfide, 3,3'-bis (triethoxysilylpropyl)tetrasulfide, 3,3'-bis (trimethoxysilylpropyl)tetrasulfide, 2,2'-bis (triethoxysilylethyl)tetrasulfide, 3,3'-bis (trimethoxysilylpropyl)trisulfide, 3,3'-bis (triethoxysilylpropyl)trisulfide, 3,3'-bis (trimethoxysilylpropyl)hexasulfide, 3,3'-bis (trimethoxysilylpropyl)octasulfide, 3,3'-bis (trioctoxysilylpropyl)tetrasulfide, 3,3'-bis (trihexoxysilylpropyl)disulfide, bis-silyl-aminosilanes, vinylmethyldiethoxysilane, vinylmethyldimethoxysilane, vinyltriethoxysilane, vinyltributoxysilane, vinyltriisopropoxysilane, vinyltriisopropenoxysilane, vinyltrimethoxysilane, vinyltriphenoxysilane, vinyltris(2-methoxyethoxy)silane, vinyldimethylethoxysilane, or mixtures thereof.

In another aspect, the invention relates to a rubber compounding agent based on the silane-modified phenolic resin described herein. Accordingly, a vulcanizable rubber composition can be made that comprises (a) a rubber component, (b) a methylene donor compound which generates formaldehyde by heating; and (c) a methylene acceptor comprising a silane-modified phenolic resin obtained by the process comprising reacting a phenolic novolak resin with a silane or a mixture of silane compounds represented by Formula (C), (D), or (E). In some embodiments, the silane-modified phenolic resin is not substantially cross-linked before the rubber composition is vulcanized. In other embodiments, no substantial amount of siloxane polymer is formed during the reaction to produce the silane-modified phenolic resin. In some embodiments, the rubber component is selected from natural rubber, styrene-butadiene rubber, butadiene rubber, isoprene rubber, acrylonitrile-butadiene rubber, chloroprene rubber, butyl rubber, halogenated butyl rubber, ethylene-propylene-diene monomer (EPDM) rubber, or mixtures thereof. In other embodiments, the vulcanizable rubber composition further comprises a reinforcing material selected from steel, polyester, nylon, aramid, fiberglass, or a combination thereof. Moreover, the reinforcing material can be a steel cord coated by brass, zinc or bronze. A fabricated article comprising the vulcanizable rubber composition can be made. For example, the fabricated article can be a tire, a power belt, a conveyor belt, a printing roll, a rubber shoe heel, a rubber shoe sole, an automobile floor mat, a truck mud flap, or a ball mill liner.

In yet another aspect, the invention relates to a method of making a fabricated rubber article. The method comprises (1) obtaining a vulcanizable rubber composition as described above mixed with a cross-linking agent; (2) embedding a reinforcing material in the vulcanizable rubber composition; and (3) effecting cross-linking of the rubber composition, wherein the reinforcing material is embedded in the rubber composition before the cross-linking and is substantially free of a silane coating before the embedding. The reinforcing material can be, for example, steel, polyester, nylon, aramid, fiberglass, and a combination thereof and be in the form of wire or cord.

Additional aspects of the invention and advantages and characteristics provided by various embodiments of the invention become apparent with the following description.

DESCRIPTION OF EMBODIMENTS OF THE INVENTION

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent 96 percent, 97 percent, 98 percent, 99 percent, or 100 percent. Moreover, any numerical range defined by two R numbers as defined in the above is also specifically disclosed.

Embodiments of the invention provide a silane-modified phenolic resin for use as a rubber compounding agent and a number of other applications. The silane-modified phenolic resin can be made by reacting a phenolic novolak resin with a silane or a mixture of silane compounds. In some embodiments, the resulting silane-modified phenolic resins is not substantially cross-linked after the reaction. By "not substantially cross-linked," it is meant that the degree of cross-linking is less than 10%, preferably less than about 5%, less than about 3%, or less than about 1%. The degree of cross-linking refers to the weight percentage of the gel (i.e., the insoluble portion in a chosen solvent) in a resin. In other embodiments, the silane-modified phenolic resin is substantially free of any siloxane polymer after the reaction. In other words, no substantial amount of siloxane polymer is formed during the reaction.

Phenolic novolak resins are polymeric materials and are made by heating a phenolic compound with a deficiency of an aldehyde or ketone, often in the presence of an acidic catalyst (such as oxalic acid or sulfuric acid). Generally, phenolic novolak resins are not cross-linked. Therefore, it is desired that the aldehyde/phenolic compound mole ratio be less than one, otherwise cross-linking and gelation will occur during manufacture. Phenolic novolak resins generally comprise no methylol functionality, have molecular weights in the range of from about 125 to about 5000, and display glass transition temperatures in the range of from about 45° C. to about 100° C. Phenolic novolaks do not condense further by themselves unless additional aldehyde or other reactive materials, i.e., formaldehyde donors such as hexamethylenetetramine, are added.

Suitable phenolic compounds that can be used to make the phenolic novolak resin are represented by Formula (A) as follows:

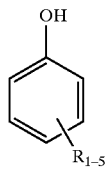

(A)

wherein $R_1$, $R_2$, $R_3$, $R_4$ and $R_5$ represent independently an organic group selected from hydrogen, hydroxyl, an alkyl having 1 to 15 carbon atoms, an aralkyl of having 8 to 12 carbon atoms, halogen, or an amino group. In Formula (A), $R_1$, $R_2$, $R_3$, $R_4$ and $R_5$ is designated as "$R_{1-5}$". However, it should be understood that $R_1$, $R_2$, $R_3$, $R_4$ and $R_5$ can independently be the same or different as defined above. Suitable phenolic compounds include, but are not limited to, phenol, substituted phenol, resorcinol, or substituted resorcinol. Therefore, the term "phenolic novolak resin" encompasses not only novolak resins based on phenol (both substituted and unsubstituted), but also those based on resorcinol (both substituted and unsubstituted).

In accordance with Formula (A), the phenolic compounds suitable for the preparation of phenolic novolak resins include, but are not limited to, mononuclear phenols with an aromatic nucleus to which at least one hydroxyl group is attached. Examples of mononuclear phenols include, but are not limited to, phenol itself, homologues of phenol such as o-cresol, m-cresol, p-cresol, o-phenylphenol, p-phenylphenol, 3,5-xylenol, 3,4-xylenol, 3-ethylphenol, 3,5-diethylphenol, p-butylphenol, 3,5-dibutylphenol, p-amylphenol, p-cyclohexylphenol, p-octylphenol, p-nonylphenol, styrylphenol, 3,5-dicyclohexylphenol, p-crotylphenol, 3,5-dimethoxyphenol, 3,4,5-trimethoxyphenol, p-ethoxyphenol, p-butoxyphenol, 3-methyl-4-methoxyphenol, aminophenol, and p-phenoxyphenol. Moreover, suitable phenolic compounds further include, but are not limited to, derivatives of dihydroxy benzene and polyhydroxy benzenes, such as resorcinol, phloroglucinol, pyrogallol, 5-methylresorcinol, 5-ethylresorcinol, 5-propylresorcinol, 2-methylresorcinol, 4-methylresorcinol, 4-ethylresorcinol, and 4-propylresorcinol. Suitable substituted resorcinol compounds include, but are not limited to, alkyl substituted resorcinol, aralkyl substituted resorcinol, or a combination of both. Examples of suitable resorcinol derivatives are disclosed in U.S. Pat. No. 4,892,908; U.S. Pat. No. 4,605, 696; U.S. Pat. No. 4,889,891; and U.S. Pat. No. 5,021,522, which are incorporated by reference herein in their entirety. Furthermore, mixtures of aldehyde-reactive phenols, such as mixed cresol isomers, xylenols and phenolic blends such as those obtained from coal tar fractionation and cashew nut shell liquid, can be employed as all or part of the phenolic compound. Multiple ring phenols such as bisphenol-A types are also suitable.

In some embodiments, at least two phenolic compounds are used. For example, the first phenolic compound can be phenol or substituted phenol; the second phenolic compound can be resorcinol or substituted resorcinol. In some instances, the first and second phenolic compounds are phenol or substituted phenol, provided that the two compounds are different. In other instances, the first and second phenolic compounds are resorcinol or substituted resorcinol, provided that the two compounds are different. Examples of such combination include, but are not limited to, phenol/t-octyl phenol; phenol/resorcinol; phenol/cresol; p-butylphenol/phenol; cresol/resorcinol, etc.

Suitable aldehydes for reaction with a phenolic compound include any aldehyde capable of such reaction. One class of such aldehydes is represented by formula: R—CH=O, wherein R is an alkyl, aryl, or aralkyl having 1–20 carbon atoms per group. For example, R can be methyl, ethyl, propyl, isopropyl, butyl, isobutyl, pentyl, isopentyl, hexyl, octyl, nonyl, decyl, benzyl, etc. Examples of such aldehydes include, but are not limited to, formaldehyde, acetaldehyde, propionaldehyde, butyraldehyde, iso-butyraldehyde, n-valeraldehyde, benzaldehyde, crotonaldehyde, cinnamaldehyde, glyoxal, glutaraldehyde, furfural, phenylacetaldehyde, chloral, chloroacetaldehyde, dichloroacetaldehyde laurylaldehyde, palmitylaldehyde, stearylaldehyde, and mixtures thereof. In addition to formaldehyde, paraformaldehyde, trioxane and tetraoxane can also be used. While aldehyde is preferred, ketone can be used instead. An example of suitable ketones is acetone.

The phenolic novolak resin can be effectively synthesized in the presence of an acid, base or ortho-directing catalyst, although it is not always necessary. Examples of suitable acid catalysts include, but are not limited to, those acids such as sulfuric, hydrochloric, phosphoric, methanesulfonic, trifluoromethanesulfonic, trifluoroacetic, formic, oxalic, benzenesulfonic, p-toluenesulfonic, mixtures thereof and the like. Examples of suitable base catalysts include, but are not limited to, alkali or alkaline earth metal hydroxides and carbonates. Catalysts suitable for use in the synthesis of an ortho substituted phenolic novolak resin can be weak organic acid salts of a divalent metal ion such as calcium, magnesium, zinc, strontium, cadmium, lead and/or barium.

The phenolic novolak resins suitable for synthesis of silane modified resins include, but are not limited to, phenol-formaldehyde novolak, phenol-alkylphenol-formaldehyde novolak, phenol-aralkylphenol-formaldehyde novolak, high ortho phenol-formaldehyde novolak, phenol-resorcinol-formaldehyde novolak, alkylphenol-resorcinol-formaldehyde novolak, aralkylphenol-resorcinol-formaldehyde novolak, resorcinol-formaldehyde novolak, alkylresorcinol-formaldehyde novolak, alkylresorcinol-resorcinol-formaldehyde novolak, aralkylresorcinol-resorcinol-formaldehyde novolak, and mixtures thereof.

In some embodiments, modified phenolic resins are used as the starting material in making the silane modified resins. The modified phenolic resins are obtained by reacting a phenolic compound, an aldehyde or ketone, and an olefinically unsaturated compound, simultaneously or sequentially. Suitable olefinically unsaturated compounds include, but are not limited to, vinyl aromatics generally represented by the following formula: R'—CH=CH$_2$, wherein R' is phenyl, substituted phenyl, or other aromatic group. Examples of suitable olefinically unsaturated compounds include, but are not limited to, styrene, α-methylstyrene, p-methylstyrene, α-chlorostyrene, divinylbenzene, vinyl-naphthalene, indene, and vinyl toluene. In some reactions, styrene is used as the olefinically unsaturated compound, and the resulting resin is a styrenated phenolic resin. Typically, the molar ratio of the phenolic compound to the olefinically unsaturated compound is between about 1:0.4 to about 1:1. In some embodiments, the molar ratio is from about 1:0.5 to about 1:0.9, from about 1:0.55 to about 1:0.8, from about 1:0.6 to 1:0.7. In other embodiments, the molar ratio is between about 1:0.60 and about 1:0.65. Additional reaction conditions are disclosed in U.S. Pat. No. 5,021,522 and U.S. Pat. No. 5,049,641, which are incorporated by reference herein in their entirety.

As described above, silane modified phenolic novolak resins can be prepared by the reaction of a phenolic resin or a blend with one or more silanes having the chemical structure represented by Formula (C), (D) or (E) under neutral conditions:

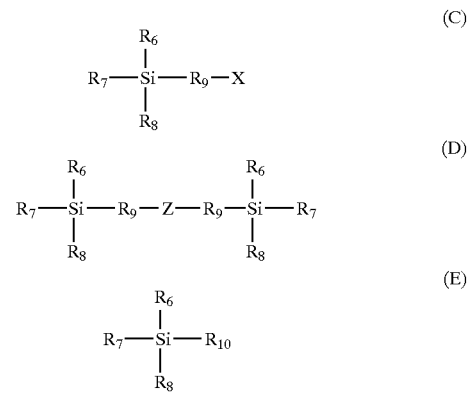

wherein $R_6$, $R_7$ and $R_8$ are independently an alkyl group of 1 to 4 carbon atoms, an alkoxy group of 1 to 8 carbon atoms, phenyl group, or a cycloalkyl group; $R_9$ is a divalent saturated or unsaturated aliphatic straight or branched hydrocarbon group with 1 to 12 carbon atoms; X is a thiol (—SH), amino, isocyanato (—NCO), urea (—NH—(C=O)—NH$_2$) or glycidylether (epoxy) group; Z is an $S_x$ (x=1–8) or NH group; and $R_{10}$ is a vinyl (—CH=CH$_2$) group or an alkoxy group.

Examples of suitable silanes according to Formula C include, but are not limited to, 3-(aminopropyl)triethoxysilane, 3-(isocyanatopropyl)triethoxysilane, 3-(glycidyloxypropyl)trimethoxysilane, 3-(mercaptopropyl)trimethoxysilane, N-beta-aminoethyl-3-(aniinopropyl)trimethoxysilane, 3-(aminopropyl)trimethoxysilane, 3-(aminoethyl)triethoxysilane, 3-(glycidyloxyethyl)triethoxysilane, 3-(mercaptopropyl)triethoxysilane, N-beta-aminoethyl-3-(aminoethyl)trimethoxysilane, 3-(aminobutyl)triethoxysilane, 3-(aminoethyl)trimethoxysilane, 3-(aminopropyl)methyl-diethoxysilane, N-(3-(triethoxysilyl)propyl)urea and the like.

Examples of suitable silanes according to Formula D include, but are not limited to, bis-silyl polysulfur silanes including 3,3'-bis(trimethoxysilylpropyl)disulfide, 3,3'-bis(triethoxysilylpropyl)tetrasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(trimethoxysilylpropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, bis-silylaminosilanes, and so on.

Examples of suitable silanes according to Formula E include, but are not limited to, vinylmethyldiethoxysilane, vinylmethyldimethoxysilane, vinyltriethoxysilane, vinyltributoxysilane, vinyltriisopropoxysilane, vinyltriisopropenoxysilane, vinyltrimethoxysilane, vinyltriphenoxysilane, vinyltris(2-methoxyethoxy)silane, vinyldimethylethoxysilane, and the like.

The silane-modified phenolic resin is prepared, for example, by mixing a phenolic resin and a silane, heating the mixture to remove alcohol formed by dealcoholization condensation reaction. The reaction temperature is about 70° C. to about 150° C., preferably about 80° C. to about 110° C. The total reaction time may vary from about 0.5 hour to about 15 hours. This reaction is preferably performed under substantially anhydrous conditions to prevent the condensation reaction of the silane itself. Additional reaction conditions suitable for carrying out the reactions are disclosed in U.S. Pat. No. 4,022,753; U.S. Pat. No. 5,177,157; U.S. Pat. No. 5,736,619; and U.S. Pat. No. 6,441,106, which are incorporated by reference herein in their entirety.

In the dealcoholization reaction, catalysts may be used to accelerate the reaction. Examples of the catalyst include, but are not limited to, acetic acid, p-toluenesulfonic acid, benzoic acid, propionic acid and like organic acids; lithium, sodium, potassium, rubidium, cesium, magnesium, calcium, barium, strontium, zinc, aluminum, titanium, cobalt, germanium, tin, lead, antimony, arsenic, cerium, boron, cadmium, manganese and like metals; oxides, organic acid salts, halides, alkoxides and the like of these metals. Among these, organic acids, organotin, tin organoate are particularly preferable. More specifically, acetic acid, dibutyltin dilaurate, tin octoate, etc., are also preferred.

The above reaction can be performed in a solvent or without a solvent. The solvent is not particularly limited insofar as it can dissolve the phenolic resin and silane. Examples of such solvent include dimethylformamide, dimethylacetamide, methyl ethyl ketone and cyclohexanone. If the rapid progress of dealcoholization reaction is desired, the reaction is preferably performed without the solvent. However, it is favorable to use a solvent when the viscosity of the reaction system is excessively increased.

In the above reaction, in order to obtain the silane-modified phenolic resin having the desired phenolic hydroxyl equivalent and viscosity, the dealcoholization reaction between the phenolic resin and silane may be stopped in the course of the reaction. A number of methods can be used to stop the reaction. For example, effective methods are cooling, deactivating the catalyst or adding alcohol to the reaction system upon obtaining the desired amount of alcohol effluent.

The thus-obtained silane-modified phenolic resin contains, as a main component, the phenolic resin having at least one of the phenolic hydroxyl groups being modified with silane. The resin may contain unreacted phenolic resin and silane, which can be separated, if desired.

In the preparation of a silane modified phenolic novolak resin, the weight ratio of silane to novolak resin can vary between 1:99 to 99:1. Due to the high cost of silanes, a silane is used at a silane to novolak resin weight ratio from about 0.5:100 to about 20:100 or from about 0.5:100 to about 5:100. In some embodiments, the ratio of the equivalent number of alkoxy groups in a silane to the equivalent number of phenolic hydroxyl groups in a phenolic novolak resin is less than 1, preferably less than about 0.5, less than about 0.01, less than about 0.009, less than about 0.008; less than about 0.007, less than about 0.006, less than about 0.005, or less than about 0.0001.

As mentioned above, a vulcanizable rubber composition can be prepared by using the silane-modified phenolic resin as the methylene acceptor. The vulcanizable rubber composition comprises: (I) a rubber component (which can be natural or synthetic rubber); and (II) a methylene donor compound which generates formaldehyde by heating; and (III) a methylene acceptor which is based on the silane-modified phenolic resin described herein. Optionally, the rubber composition may further comprise (IV) a vulcanizing agent, such as sulfur; and (V) one or more rubber additives. In some embodiments, the vulcanizable rubber composition is formulated using a methylene acceptor based on a phenolic resin not modified by a silane. Such phenolic resins are described in the above. For example, one such resin is phenol/t-octyl phenol/formaldehyde novolak.

The rubber component can be any natural rubber, synthetic rubber or combination thereof. Specific examples of synthetic rubbers include neoprene (polychloroprene), polybutadiene, polyisoprene, butyl rubber, copolymers of 1,3-butadiene or isoprene with monomers such as styrene, acrylonitrile and methyl methacrylate as well as ethylene/propylene/diene monomer (EPDM) and in particular ethylene/propylene/dicyclopentadiene terpolymers.

The methylene donor component can be any compound that generates formaldehyde upon heating during the vulcanization and capable of reacting with the methylene acceptor used in the rubber compound formulations. Examples of suitable methylene donors include, but are not limited to, hexamethylenetetramine (HEXA or HMT) and hexamethoxymethylmelamine (HMMM). Other suitable methylene donors are described in U.S. Pat. No. 3,751,331, which is incorporated by reference herein in its entirety. The methylene donor is usually present in concentrations from about 0.5 to 15 parts per one hundred parts of rubber, preferably from 0.5 to 10 parts per one hundred parts of rubber. The weight ratio of methylene donor to methylene acceptor may vary. But, in general, the weight-ratio will range from 1:10 to 10:1. Preferably, the weight ratio of methylene donor to methylene acceptor ranges from 1:3 to 3:1.

The vulcanizable rubber composition may include a vulcanizing agent, such as sulfur. Examples of suitable sulfur vulcanizing agents include elemental sulfur or sulfur donating vulcanizing agents. Preferably, the sulfur vulcanizing agent is elemental sulfur. Other cross-linking agents may also be used.

The vulcanizable rubber composition may also include one or more of additives used in rubber compositions. The additives commonly used in the rubber stocks include carbon black, cobalt salts, stearic acid, silica, zinc oxide, fillers, plasticizers, waxes, processing oils, retarders, antiozonants and the like.

Accelerators are also used to control the time and/or temperature required for the vulcanization and to improve the properties of the vulcanizate. Suitable accelerators include, but are not limited to, amines, disulfides, guanidines, thioureas, thiazoles, thiurams, sulfenamides, dithicarbonates and zanthates. Preferably, the primary accelerator is a sulfenamide.

Embodiments of the invention also provide a method for improving the adhesion of rubber to reinforcing materials, thus a method of making a fabricated rubber article due to the improved adhesion between rubber and a reinforcing material. The method comprises (i) mixing a cross-linking agent with a vulcanizable rubber composition made in accordance with an embodiment of the invention as described above; (ii) embedding a reinforcing material in the vulcanizable rubber composition before the rubber composition is cross-linked; and (iii) effecting cross-linking of the rubber composition. Preferably, the reinforcing material is not coated with a silane composition before the embedding. In other words, the reinforcing material is substantially free of a silane coating before the embedding. The term "embedding" means that the reinforcing material is combined with a rubber composition in any suitable manner, such as laminating, calendering, mixing, etc. While it is preferred to have the reinforcing material closely enclosed in a matrix of the rubber composition, it need not be the case. While the silane-modified phenolic resin is not substantially cross-linked before it is used in a rubber composition, it should be understood that it becomes cross-linked when the rubber composition is vulcanized.

The reinforcing material can be in the form of cords, wires, fibers, filaments, fabrics, etc. Examples of suitable reinforcing materials include, but are not limited to steel (which can be coated by brass, zinc or bronze), polyester, nylon, aramid, fiberglass, and other organic or inorganic compositions.

While not necessary, the reinforcing material can be coated with an adhesive composition before it is combined with a uncured rubber composition. Any adhesive composition that enhances the adhesion between the reinforcing material and the cured rubber component can be used. For examples, certain suitable adhesive compositions for enhancing the adhesion between rubber and a reinforcing material are disclosed in the following U.S. Pat. Nos. 6,416,869; 6,261,638; 5,789,080; 5,126,501; 4,588,645; 4,441,946; 4,236,564; 4,051,281; 4,052,524; and 4,333,787, which are incorporated by reference herein in their entirety. These adhesive compositions can be used according to the methods taught therein, with or without modifications. However, the adhesive composition for coating the reinforcing material does not include the silanes represented by Formulas (C), (D), and (E).

The rubber compositions based on the above resins may be used in the manufacture of composite products, such as tires, power belts, conveyor belts, printing rolls, rubber shoe heels and soles, rubber wringers, automobile floor mats, mud flaps for trucks, ball mill liners, and the like. The rubber compositions described herein also may be used as a wire coat or bead coat for use in tire applications. Any form of cobalt compounds known in to promote the adhesion of rubber to metal, such as stainless steel, may be used. Suitable cobalt compounds include, but are not limited to, cobalt salts of fatty acids, such as stearic acid, palmitic, oleic, linoleic and the like; cobalt salts of aliphatic or alicyclic carbocylic acids having 6 to 30 carbon atoms; cobalt chloride, cobalt naphthenate, cobalt neodeconoate, and an organo-cobalt-boron complex commercially available under the trade name Manobond® 680C from OM Group, Inc., Cleveland, Ohio.

The following examples are presented to exemplify embodiments of the invention. All numerical values are approximate. When numerical ranges are given, it should be understood that embodiments outside the stated ranges may still fall within the scope of the invention. Specific details described in each example should not be construed as necessary features of the invention.

Cure properties were measured with an Alpha Technologies MDR Rheometer at 150° C., 0.5° arc and 1.67 Hz according to ASTM D-5289. Wire pullout adhesion was determined for each test compound by ASTM D-2229-02 using brass plated steel cord with 63.7% copper plating embedded 19 mm into the rubber pad.

The softening point of the resins was measured according to the following method with reference to the latest edition of ASTM E 28 and ASTM D 3104, which are incorporated by reference herein in their entirety.

Apparatus: cups—pitch type drilled to 0.257" opening (F drill); a 440 stainless steel ball (0.2500" in diameter and must pass through cups); a Mettler softening point apparatus comprising (1) a control unit Model FP-90 or equivalent, (2) a furnace Model FP-83 or equivalent, and (3) cartridge assemblies; a timer; porcelain evaporating dishes (about 3" in diameter); and a hot plate. For calibration of the Mettler apparatus, see ASTM D 3104, which is incorporated by reference herein.

Procedures: Melt 15 grams of resin in a porcelain or aluminum evaporating dish. At 600–650° F., surface temperature of hot plate, melting time is approximately 4 minutes. Overheating should be avoided. When the resin is melted, pour into cups that have been preheated to at least the temperature of the molten resin. The quantity of resin poured into the cups should be such that after solidification the excess can be removed with a heated spatula or putty knife. An aluminum plate with holes drilled in it to form a support on the sides and bottom of the cup can be used, or they can be held with forceps when removing excess resin. After the samples have been cooled to room temperature in a desiccator, assemble the cartridge so that the ball rests on the top of the resin. Place the assembled cartridge in the furnace, which has been preset to 85° C. or 10–15° C. below the expected soft point. Set the heating rate at 1° C./min. Turn the cartridge until it locks into position, and wait 30 seconds. Then, initiate operation of softening point apparatus. Read the completed softening point on the indicator. Duplicate determinations should not differ by more than 1.0° C.

EXAMPLE 1

Synthesis of Resorcinol-Formaldehyde Novolak Resin Modified with 3-(Aminopropyl) triethoxysilane Into a 500 mL reaction kettle equipped with a stirrer, thermometer, reflux condenser, and an addition funnel, 143.1 grams (1.3 mole) of resorcinol was charged and heated to 120–130° C. After reaching the temperature, 63.4 grams (0.79) moles of 37.6% formaldehyde was added dropwise over a period of 90–120 minutes under reflux conditions. Upon completion of the formaldehyde addition, the reaction was allowed to reflux for an additional 30–60 minutes. The reaction temperature was increased to remove water distillate under atmospheric pressure and then under reduced pressure. Once distillation was complete, the reaction temperature was adjusted to 120–140° C. 3-(Aminopropyl) triethoxysilane, at a level of about 3 wt. % of the resin yield, was added dropwise and allowed to mix for 15–30 minutes. The final product had a softening point of 107.7° C. with a free resorcinol content of 17 weight percent by Gas Chromatography/Liquid Chromatography ("GC/LC") analysis. Carbon-13 and proton NMR analysis revealed chemical shifts characteristic of a mixture of resorcinol/ formaldehyde resin and free resorcinol. NMR spectral evidence does indicate that the amino group has reacted with the resorcinolic hydroxyls to form aryl-NH—$CH_2$ $CH_2$ $CH_2$—Si structures. No unreacted —$CH_2NH_2$ structure was observed.

EXAMPLE 2

Synthesis of Resorcinol-Formaldehyde Novolak Resin Modified with Triethoxyvinylsilane Into a 500 mL reaction kettle equipped with a stirrer, thermometer, reflux condensor, and an addition funnel, 143.1 grams (1.3 mole) of resorcinol was charged and heated to 120–130° C. After reaching the temperature, 63.4 grams (0.79 moles) of 37.6% formaldehyde was added dropwise over a period of 90–120 minutes under reflux conditions. Upon completion of the formaldehyde addition, the reaction was allowed to reflux for an additional 30–60 minutes. After cooling to 95–105° C., 1.7 grams of oxalic acid was charged to the reaction and held under reflux conditions for 15–30 minutes. The reaction temperature was increased to remove water distillate under atmospheric pressure and then under reduced pressure. Once distillation was complete, the reaction temperature was adjusted to 120–140° C. Triethoxyvinylsilane, at a level of about 3 wt. % of the resin yield, was added dropwise and allowed to mix for 15–30 minutes. The final product had a softening point of 105.4° C. with a free resorcinol content of 17 weight percent determined by GC/LC analysis. Carbon-13 and proton NMR analysis revealed chemical shifts characteristic of a mixture of resorcinol/formaldehyde resin and free resorcinol. In addition, no ethoxysilane structure (Si—O—$CH_2CH_3$) or unreacted vinyl structure were detected.

EXAMPLE 3

Synthesis of Phenolic and Resorcinolic Novolak Resin Blend Modified with Triethoxy(3-isocyanatopropyl)silane Into a 500 mL reaction kettle equipped with a stirrer, thermometer, reflux condensor, Dean Stark, and an addition funnel, 128.3 grams (1.35 mole) of phenol, 21.3 grams (0.1 mole) t-octylphenol, 1.0 gram p-toluene sulfonic acid, and 50–70 grams of toluene were charged and heated to reflux. After reaching the refluxing temperature, 83.9 grams (1.05) moles of 37.6% formaldehyde was added dropwise over a period of 3–5 hours under reflux conditions. Water from the formaldehyde solution was collected and drained from the Dean Stark during the addition. Upon completion of the formaldehyde addition, the reaction was allowed to reflux for an additional 30–60 minutes. After cooling to 90–95° C., 0.5 grams of 50% sodium hydroxide was charged to neutralize the acid catalyst. The reaction temperature was increased to 110–120° C., then 165.0 grams of Penacolite® R-50, a resorcinol/formaldehyde resin, was added dropwise over 20–60 minutes under reflux conditions. The reaction temperature was increased to remove water distillate under atmospheric pressure and then under reduced pressure. Once distillation was complete, the reaction temperature was adjusted to 120–140° C. Triethoxy(3-isocyanatopropyl) silane, at a level of about 3 wt. % of the resin yield, was added dropwise and allowed to mix for 15–30 minutes. The final product had a softening point of 105.0° C. GC/LC analysis showed a free phenol content of 1.5 weight percent, a free t-octylphenol content of 1.7 weight percent, and a free resorcinol content of 6.0 weight percent.

IR analysis revealed absorption peaks characteristic of a phenol/resorcinol/formaldehyde resin containing low level carbamate structures [—O—C(=O)—NH—] from the reaction of the isocyanate structure with a hydroxyl group. Little, if any, unreacted —N=C=O structure was detected.

EXAMPLE 4

Synthesis of t-Octylphenol-Formaldehyde-Resorcinol Novolak Resin Modified with Bis(3-(trimethoxysilyl)propyl)amine Into a 500 mL reaction kettle equipped with a stirrer, thermometer, reflux condensor, and an addition funnel, 106.3 grams (0.50 mole) of t-octylphenol, 25.3 grams (0.80 mole) of paraformaldehyde (95%, untreated), 19.2 grams (0.24 mole) of 37.6% formaldehyde, and 43.2 grams of xylene was charged and heated to 75–80° C. After reaching the temperature, 6.4 grams (0.04 moles) of 25% sodium hydroxide was added dropwise over a period of 20–30 minutes. The reaction was heated to 85–90° C. and held for 3–5 hours. The reaction was cooled to 60–65° C. and resorcinol was charged over 15–20 minutes. After the resorcinol charge, the reaction was heated to 100–110° C. and held for 60–90 minutes. After cooling the reaction to 85–90° C., 7.8 grams (0.04 moles) of 50% sulfuric acid was slowly added over 5–10 minutes. The reaction temperature was increased to remove water distillate under atmospheric pressure and then under reduced pressure. Once distillation was complete, the reaction temperature was adjusted to 120–140° C. Bis(3-(trimethoxysilyl)propyl)amine (BTPA), at a level of about 3 wt. % of the resin yield, was added dropwise and allowed to mix for 15–30 minutes. The final product had a softening point of 116.5° C. GC/LC analysis showed a free resorcinol content of 8.6 weight percent, a free phenol content of 0.14 weight percent, and a free t-octylphenol content of 2.7 weight percent.

EXAMPLE 5

Synthesis of Resorcinol-Formaldehyde Novolak Resin Modified with Tris(2-methoxyethoxy) vinylsilane Into a 500 mL reaction kettle equipped with a stirrer, thermometer, reflux condensor, and an addition funnel, 143.1 grams (1.3 mole) of resorcinol was charged and heated to 120–130° C. After reaching the temperature, 63.4 grams (0.79) moles of 37.6% formaldehyde was added dropwise over a period of 90–120 minutes under reflux conditions. Upon completion of the formaldehyde addition, the reaction was allowed to reflux for an additional 30–60 minutes. After cooling to 95–105° C., 1.7 grams of oxalic acid was charged to the reaction and held under reflux conditions for 15–30 minutes. The reaction temperature was increased to remove water distillate under atmospheric pressure and then under reduced pressure. Once distillation was complete, the reaction temperature was adjusted to 120–140° C. Tris(2-methoxyethoxy)vinylsilane, at a level of about 3 wt. % of the resin yield, was added dropwise and allowed to mix for 15–30 minutes. The final product had a softening point of 106.6° C. with a free resorcinol content of 17 weight percent by GC/LC analysis. Carbon-13 and proton NMR analysis revealed chemical shifts characteristic of a mixture of resorcinol/formaldehyde resin and free resorcinol. Also, no 2-methoxyethoxysilane or unreacted vinyl structures were detected. The absence of methoxyethoxysilane structure (Si—$OCH_2CH_2OCH_3$) indicates hydrolysis to SiOH groups by a possible reaction with the hydroxyl groups present in the resorcinolic resin.

EXAMPLE 6

Synthesis of Resorcinol-Styrene-Formaldehyde Novolak Resin Modified with Trimethoxyvinylsilane Into a 500 mL reaction kettle equipped with a stirrer, thermometer, reflux condensor, and an addition funnel, 110.1 grams (1.0 mole) of resorcinol and 0.35 grams of p-toluene sulfonic acid were charged and heated to 120–130° C. After reaching the temperature, 73.6 grams (0.70 mole) of styrene was added dropwise over 30–60 minutes at 125–130° C. After the styrene charge, the reaction was held at 125–135° C. for 15–30 minutes. The temperature was then increased to 150–155° C. and maintained for 15–30 minutes. After cooling to 130–140° C., 6.0 grams (0.055 mole) of additional resorcinol was slowly added. Once the second resorcinol charge was added, 51.8 grams (0.65) moles of 37.7% formaldehyde was added dropwise over a period of 30–60 minutes under reflux conditions.

Upon completion of the formaldehyde addition, the reaction was cooled to 90–100° C. After cooling to 90–100° C., 3.6 grams of denatured alcohol was charged to the reaction. Then 0.2 grams of 50% sodium hydroxide was added to neutralize the catalyst. The reaction temperature was increased to remove water distillate under atmospheric pressure and then under reduced pressure. Once distillation was complete, the reaction temperature was adjusted to 120–140° C. Trimethoxyvinylsilane, at a level of about 3 wt. % of the resin yield, was added dropwise and allowed to mix for 15–30 minutes. The final product had a softening point of 104.3° C. with a free resorcinol content of 0.83 weight percent. Proton NMR analysis revealed the absence of unreacted vinyl silane in the resin and also indicated the presence of aryl-CH(CH$_3$)—Si and Si—O—CH$_3$ groups in the modified resin. The presence of aryl-CH(CH$_3$)—Si group indicated the reaction of vinyl silane with the resorcinol or resorcinolic resin present in the resin product.

EXAMPLE 7

Synthesis of Resorcinol-Styrene-Formaldehyde Novolak Resin Modified with (N-(3-triethoxysilyl)propyl)urea Into a 500 mL reaction kettle equipped with a stirrer, thermometer, reflux condenser, and an addition funnel, 110.1 grams (1.0 mole) of resorcinol and 0.35 grams of p-toluene sulfonic acid were charged and heated to 120–130° C. After reaching the temperature, 73.6 grams (0.70 mole) of styrene was added dropwise over 30–60 minutes at 125–130° C. After the styrene charge, the reaction was held at 125–135° C. for 15–30 minutes. The temperature was then increased to 150–155° C. and maintained for 15–30 minutes. After cooling to 130–140° C., 6.0 grams (0.055 mole) of additional resorcinol was slowly added. Once the second resorcinol charge was added, 51.8 grams (0.65) moles of 37.7% formaldehyde was added dropwise over a period of 30–60 minutes under reflux conditions. Upon completion of the formaldehyde addition, the reaction was cooled to 90–100° C. After cooling to 90–100° C., 3.6 grams of denatured alcohol was charged to the reaction. Then 0.2 grams of 50% sodium hydroxide was added to neutralize the catalyst. The reaction temperature was increased to remove water distillate under atmospheric pressure and then under reduced pressure. Once distillation was complete, the reaction temperature was adjusted to 120–140° C. N-(3-triethoxysilyl)propyl)urea solution (50% in methanol), at a level of about 3 wt. % of the resin yield, was added dropwise and allowed to mix for 15–30 minutes. The final product had a softening point of 98.2° C. with a free resorcinol content of 0.77 weight percent. The proton NMR analysis indicated the presence of aryl-NH—C(=O)—NHCH$_2$— and Si—O—CH$_2$CH$_3$ groups in the resin structure, suggesting the reaction of the added silane with the resorcinol or resorcinolic resin.

EXAMPLE 8

Synthesis of Resorcinol-Styrene-Formaldehyde Novolak Resin Modified with 3-(Aminopropyl)triethoxysilane Into a 500 mL reaction kettle equipped with a stirrer, thermometer, reflux condenser, and an addition funnel, 110.1 grams (1.0 mole) of resorcinol and 0.35 grams of p-toluene sulfonic acid were charged and heated to 120–130° C. After reaching the temperature, 73.6 grams (0.70 mole) of styrene was added dropwise over 30–60 minutes at 125–130° C. After the styrene charge, the reaction was held at 125–135° C. for 15–30 minutes. The temperature was then increased to 150–155° C. and maintained for 15–30 minutes. After cooling to 130–140° C., 6.0 grams (0.055 mole) of additional resorcinol was slowly added. Once the second resorcinol charge was added, 51.8 grams (0.65) moles of 37.7% formaldehyde was added dropwise over a period of 30–60 minutes under reflux conditions. Upon completion of the formaldehyde addition, the reaction was cooled to 90–100° C. After cooling to 90–100° C., 3.6 grams of denatured alcohol was charged to the reaction. Then 0.2 grams of 50% sodium hydroxide was added to neutralize the catalyst. The reaction temperature was increased to remove water distillate under atmospheric pressure and then under reduced pressure. Once distillation was complete, the reaction temperature was adjusted to 120–140° C. 3-(Aminopropyl)triethoxysilane, at a level of about 3 wt. % of the resin yield, was added dropwise and allowed to mix for 15–30 minutes. The final product had a softening point of 110.4° C. with a free resorcinol content of 0.76 weight percent. Proton NMR analysis revealed the presence of aryl-N(H)—CH$_2$CH$_2$CH$_2$—Si and Si—O—CH$_2$CH$_3$ groups and the absence of unreacted Si—CH$_2$CH$_2$CH$_2$—NH$_2$ group. The presence of aryl-N(H)—CH$_2$CH$_2$CH$_2$—Si group in the resin structure indicated a reaction of the added silane with the resorcinol or resorcinolic resin.

EXAMPLE 9

Synthesis of Resorcinol-Styrene-Formaldehyde Novolak Resin Modified with (3-mercaptopropyl)triethoxysilane Into a 500 mL reaction kettle equipped with a stirrer, thermometer, reflux condensor, and an addition funnel, 110.1 grams (1.0 mole) of resorcinol and 0.35 grams of p-toluene sulfonic acid were charged and heated to 120–130° C. After reaching the temperature, 73.6 grams (0.70 mole) of styrene was added dropwise over 30–60 minutes at 125–130° C. After the styrene charge, the reaction was held at 125–135° C. for 15–30 minutes. The temperature was then increased to 150–155° C. and maintained for 15–30 minutes. After cooling to 130–140° C., 6.0 grams (0.055 mole) of additional resorcinol was slowly added. Once the second resorcinol charge was added, 51.8 grams (0.65) moles of 37.7% formaldehyde was added dropwise over a period of 30–60 minutes under reflux conditions. Upon completion of the formaldehyde addition, the reaction was cooled to 90–100° C. After cooling to 90–100° C., 3.6 grams of denatured alcohol was charged to the reaction. Then 0.2 grams of 50% sodium hydroxide was added to neutralize the catalyst. The reaction temperature was increased to remove water distillate under atmospheric pressure and then under reduced pressure. Once distillation was complete, the reaction temperature was adjusted to 120–140° C. (3-Mercaptopropyl)triethoxysilane, at a level of about 3 wt. % of the resin yield, was added dropwise and allowed to mix for 15–30 minutes. The final silane modified product had a softening point of 110.4° C. with a free resorcinol content of 0.82 weight percent.

EXAMPLE 10

Synthesis of Phenol-Formaldehyde Novolak Resin Modified with 3-(isocyanatopropyl)triethoxysilane Into a 500 mL reaction kettle equipped with a stirrer, thermometer, reflux condensor, and an addition funnel, 137.8 grams (1.45 mole) of phenol and 1.0 gram of p-toluene sulfonic acid were charged and heated to 90–95° C. After reaching the temperature, 83.9 grams (1.05) moles of 37.6% formaldehyde was added dropwise over a period of 60–120 minutes at 95–100° C. Upon completion of the formaldehyde addition, the reaction was heated to reflux. The reaction was held for 2–4 hours under reflux conditions. After reflux, 0.5 grams of 50% sodium hydroxide was added to neutralize the acid catalyst. The reaction temperature was increased to remove water distillate under atmospheric pressure and then under reduced pressure. Once distillation was complete, the reaction temperature was adjusted to 120–140° C. Triethoxy(3-isocyanatopropyl)silane, at a level of about 3 wt. % of the resin yield, was added dropwise and allowed to mix for 15–30 minutes. The final silane modified product had a softening point of 96.5° C. and a free phenol content of 2.6 weight percent by GC/LC analysis. IR analysis revealed absorptions characteristic of a phenol/formaldehyde resin containing a low level of carbamate structure [—O—C(=O)—N(—H)—]. The carbamate structure is the result of the reaction of —N=C=O structure with an aryl-OH group. Little, if any, unreacted —N=C=O structure was detected. Proton NMR analysis indicated the presence of aryl-O—C(=O)NH—CH$_2$CH$_2$CH$_2$—Si— and Si—OCH$_2$CH$_3$ groups, confirming the reaction of the silane and the phenolic resin.

EXAMPLE 11

Synthesis of Phenol-t-Octylphenol-Formaldehyde Novolak Resin Modified with (3-mercaptopropyl) triethoxysilane Into a 500 mL reaction kettle equipped with a stirrer, thermometer, reflux condensor, and an addition funnel, 128.3 grams (1.35 mole) of phenol, 21.3 grams (0.1 mole) of t-octylphenol, and 1.0 gram of p-toluene sulfonic acid were charged and heated to 90–95° C. After reaching the temperature, 83.9 grams (1.05) moles of 37.6% formaldehyde was added dropwise over a period of 60–120 minutes at 95–100° C. Upon completion of the formaldehyde addition, the reaction was heated to reflux. The reaction was held for 2–4 hours under reflux conditions. After reflux, 0.5 grams of 50% sodium hydroxide was added to neutralize the acid catalyst. The reaction temperature was increased to remove water distillate under atmospheric pressure and then under reduced pressure. Once distillation was complete, the reaction temperature was adjusted to 120–140° C. (3-Mercaptopropyl)-triethoxysilane, at a level of about 3 wt. % of the resin yield, was added dropwise and allowed to mix for 15–30 minutes. The final silane modified resin product had a softening point of 93.7° C. with a free phenol content of 0.98 weight percent and a free t-octylphenol content of 3.7 weight percent by GC/LC analysis.

EXAMPLE 12

Synthesis of Phenolic Novolak Resin Modified with Triethoxyvinylsilane

Into a 500 mL reaction kettle equipped with a stirrer, thermometer, reflux condenser, and an addition funnel, 128.3 grams (1.35 mole) of phenol, 21.3 grams (0.1 mole) of t-octyl phenol, and 1.0 grams of zinc acetate were charged and heated to 45–55° C. After reaching the temperature, 59.9 grams (0.75 mole) of 37.6% formaldehyde was added streamwise over 5–10 minutes. After the formaldehyde charge, the reaction was heated to reflux and maintained for 1–2 hours. The reaction was cooled to 85–95° C. and another 24.0 grams (0.3 moles) of 37.6% formaldehyde was added dropwise over 15–30 minutes at 85–95° C. After the addition, the reaction was heated to reflux and maintained for another 1–2 hours. The reaction temperature was then increased to remove water distillate under atmospheric pressure. The distillate was collected to 125–130° C. Once the first distillation was complete, the reaction was again set-up for reflux. The reaction was held under reflux for an additional 1–2 hours. The reaction temperature was increased to remove water distillate under atmospheric pressure for the second time. The distillate was collected to 150–155° C., then distilled under vacuum conditions to 155–160° C. Once distillation was complete, the reaction temperature was adjusted to 120–140° C. Triethoxyvinylsilane, at a level of about 3 wt. % of the resin yield, was added dropwise and allowed to mix for 15–30 minutes. The final product had a softening point of 100.9° C. with a free phenol content of 2.0 weight percent, a free t-octyl phenol content of 1.4 weight percent, and a free triethoxyvinylsilane content of 1.2 weight percent by GC/LC analysis.

EXAMPLE 13

Synthesis of Phenolic Novolak Resin Without Silane Modification

Into a 500 mL reaction kettle equipped with a stirrer, thermometer, reflux condenser, and an addition funnel, 128.3 grams (1.35 mole) of phenol, 21.3 grams (0.1 mole) of t-octyl phenol, and 1.0 grams of zinc acetate were charged and heated to 45–55° C. After reaching the temperature, 59.9 grams (0.75 mole) of 37.6% formaldehyde was added streamwise over 5–10 minutes. After the formaldehyde charge, the reaction was heated to reflux and maintained for 1–2 hours. The reaction was cooled to 85–95° C. and another 24.0 grams (0.3 moles) of 37.6% formaldehyde was added dropwise over 15–30 minutes at 85–95° C. After the addition, the reaction was heated to reflux and maintained for another 1–2 hours. The reaction temperature was then increased to remove water distillate under atmospheric pressure. The distillate was collected to 125–130° C. Once the first distillation was complete, the reaction was again set-up for reflux. The reaction was held under reflux for an additional 1–2 hours. The reaction temperature was increased to remove water distillate under atmospheric pressure for the second time. The distillate was collected to 150–155° C., then distilled under vacuum conditions to 155–160° C. The resin obtained from the reactor had a softening point of 108.7° C. with a free phenol content of 2.6 weight percent and a t-octyl phenol of 1.3 weight percent by GC/LC analysis.

EXAMPLE 14

Rubber Compounding and Testing

The methylene acceptor resins prepared according to examples 12 and 13 were evaluated in a black natural rubber compound to assess their performance for the improved steel-wire adhesion properties under heat and humidity aged conditions. Black natural rubber compositions, having the formulation shown in Table 1, were prepared in a 3-stage mixing procedure. These rubber compositions were then used to evaluate the adhesion effects of the compounds as methylene acceptors in combination with the methylene donor hexamethoxymethylmelamine (HMMM). The methylene donor/acceptor ratio was kept at 2:3 for the methylene acceptor with a combined loading of 5 parts by weight in the rubber compound.

TABLE 1

Rubber Composition Formulation

| Rubber Compound Used in Testing<br>Master Batch | Parts by<br>Weight |
|---|---|
| First Stage | |
| 1. Natural Rubber | 100 |
| 2. Carbon Black | 55 |
| 3. Zinc Oxide | 8 |
| 4. Stearic Acid | 1 |
| 5. N-(1,2-Dimethylbutyl)-N'-Phenyl-p-Phenylene Diamine | 2 |
| 6. Pre-Vulcanization Inhibitor [N-(Cyclohexylthio) Phthalimide] | 0.2 |
| 7. Polymerized 1,2-Dihydro-2,2,4-Trimethyl Quinoline | 1 |
| Second Stage | |
| 8. Methylene Acceptor (Phenolic/Resorcinolic Resin) | 3 |
| 9. Cobalt Salt (Manobond 680C, 22% Co) | 0.45 |
| Third Stage (Final) | |
| 10. Insoluble Sulfur (80%, oiled) | 5 |
| 11. N.N-Dicylohexyl-2-Benzenethiazole Sulfenamide | 1 |
| 12. Methylene Donor (HMMM, 72% Active) | 2.78 |

The rubber masterbatch was mixed in the first stage to about 150° C. temperature in a Banbury mixer. In a second stage, a methylene acceptor and a cobalt salt were mixed into an appropriate amount of masterbatch on to the two roll mill at about 121° C. Insoluble sulfur, an accelerator, and an appropriate amount of HMMM as indicated in Table 1 were mixed in the third stage at 95° C. The test compounds were conditioned overnight in a constant temperature room at about 23° C. and 50% relative humidity. The compounds were then tested for Rheometer cure, shaped, and optimum cured at 150° C. for the evaluation of wire adhesion and mechanical properties.

Cure properties were measured with an Alpha Technologies MDR Rheometer at 150° C., 0.5° arc and 1.67 Hz according to ASTM D-5289. Wire pullout adhesion was determined for each test compound by ASTM D-2229-14 02 using brass plated steel cord with 63.7% copper plating embedded 19 mm into the rubber pad. Table 2 illustrates the cure behavior, wire adhesion, physical and mechanical properties of cured rubber compounds for the methylene acceptor resins of Examples 12 and 13.

TABLE 2

Rubber Compound Properties

| Compound | | |
|---|---|---|
| Methylene Acceptor | Example 13 | Example 12 |
| Methylene Donor | HMMM | HMMM |
| Weight Ratio; Acceptor/Donor, phr | 3.0/2.0 | 3.0/2.0 |
| Mooney Viscosity (212° F.), ML 1 + 4 | 65.33 | 65.16 |
| Rheometer Cure at 150° C. | | |
| $M_H$, dN-m | 41.1 | 40.61 |
| $M_L$, dN-m | 2.89 | 2.87 |
| $t_s2$, minutes | 3.23 | 3.24 |
| t'90, minutes | 25.12 | 25 |
| Wire Adhesion, N (% Rubber Coverage) 3 × 0.2 + 6 × 0.35 wire; 63.72% Cu | | |
| Unaged | 1103(90) | 1196(85) |
| Steam-aged, 24 Hours at 120° C. | 1221(90) | 1356(90) |
| Humidity-aged, 21 Days, 85° C./95% RH | 1119(75) | 1246(90) |
| Shore A Hardness | 88 | 87 |
| Tensile Properties | | |
| 100% Modulus, MPa | 5.2 | 5.38 |
| Tensile Strength, MPa | 24.8 | 25.4 |
| Elongation, % | 440 | 442 |
| Die-C Tear, KN/m | 103 | 103 |

From the Table 2 results, it is clear that the steel wire unaged, heat-, and humidity-aged adhesion properties for the silane-modified phenolic resins showed improved performances. Under humidity aged conditions, the rubber coverage on the steel wire showed 90% for the silane-modified phenolic resin. This data suggest that the use of silane-modified phenolic novolak resins in the rubber compounds appeared to enhance the steel wire adhesion with the rubber compounds. The humidity aged adhesion enhancement may be due to the protection of the steel wires from corrosion by the presence of water- or moisture-resistant phenolic and siloxane cross-linked network structures at the steel wire and rubber interface.

As demonstrated above, embodiments of the invention provide a silane-modified phenolic resin for use in rubber compounding. The silane-modified phenolic resins have lower softening points and therefore would enhance the processability of the uncured rubber compositions which incorporate the resin. However, the improved processability does not compromise other performance properties. For example, the adhesion properties and tear properties of the uncured rubber composition are comparable or better than existing phenolic resins. Accordingly, use of the silane-modified phenolic resin in rubber compounding should yield better rubber products.

While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein. Variations and modifications from the described embodiments exist. The method of making the resins is described as comprising a number of acts or steps. These steps or acts may be practiced in any sequence or order unless otherwise indicated. Finally, any number disclosed herein should be construed to mean approximate, regardless of whether the word "about" or "approximately" is used in describing the number. The appended claims intend to cover all those modifications and variations as falling within the scope of the invention.

What is claimed is:

1. A vulcanizable rubber composition comprising (a) a rubber component, (b) a methylene donor compound which generates formaldehyde by heating; and (c) a methylene acceptor comprising a silane-modified phenolic resin obtained by the process comprising reacting a phenolic novolak resin with a silane or a mixture of silane compounds represented by Formula (C), (D), or (E):

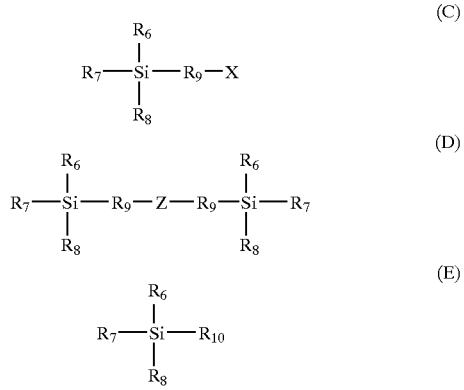

wherein $R_6$, $R_7$ and $R_8$ are independently an alkyl group of 1 to 4 carbon atoms, an alkoxy group of 1 to 8 carbon atoms, phenyl group, cycloalkyl group; $R_9$ is a divalent saturated or unsaturated aliphatic straight or branched hydrocarbon group with 1 to 12 carbon atoms; X is a thiol, amino, isocyanato, urea or glycidylether group; Z is $S_x$ or a NH group, wherein x is 1, 2, 3, 4, 5, 6, 7, or 8; and $R_{10}$ is a vinyl group or an alkoxy group.

2. The vulcanizable rubber composition of claim 1, wherein the silane-modified phenolic resin is not substantially cross-linked before the rubber composition is vulcanized.

3. The vulcanizable rubber composition of claim 1, wherein no substantial amount of siloxane polymer is formed during the reaction to produce the silane-modified phenolic resin.

4. The vulcanizable rubber composition of claim 1, wherein the rubber component is selected from natural rubber, styrene-butadiene rubber, butadiene rubber, isoprene rubber, acrylonitrile-butadiene rubber, chloroprene rubber, butyl rubber, halogenated butyl rubber, ethylene-propylene-diene monomer (EPDM) rubber, or mixtures thereof.

5. The vulcanizable rubber composition of claim 1, further comprising a reinforcing material selected from steel, polyester, nylon, aramid, fiberglass, or a combination thereof.

6. The vulcanizable rubber composition of claim 4, wherein the reinforcing material is a steel cord coated by brass, zinc or bronze.

7. A fabricated article comprising the vulcanizable rubber composition of claim 1.

8. The fabricated article of claim 7, wherein the fabricated article is a tire, a power belt, a conveyor belt, a printing roll, a rubber shoe heel, a rubber shoe sole, an automobile floor mat, a truck mud flap, or a ball mill liner.

9. A method of making a fabricated rubber article, comprising:
obtaining a vulcanizable rubber composition of claim 1, mixed with a cross-linking agent;
embedding a reinforcing material in the vulcanizable rubber composition; and
effecting cross-linking of the rubber composition,
wherein the reinforcing material is embedded in the rubber composition before the cross-linking and is substantially free of a silane coating before the embedding.

10. The method of claim 9, wherein the reinforcing material is selected from steel, polyester, nylon, aramid, fiberglass, or a combination thereof.

11. The method of claim 9, wherein the reinforcing material is in the form of wire or cord.

12. The vulcanizable rubber composition of claim 1, wherein the phenolic novolak resin is selected from phenol-formaldehyde novolak, phenol-alkyl-phenol-formaldehyde novolak, phenol-aralkylphenol-formaldehyde novolak, high ortho phenol-formaldehyde novolak, phenol-resorcinol-formaldehyde novolak, alkylphenol-resorcinol-formaldehyde novolak, aralkylphenol-resorcinol-formaldehyde novolak, resorcinol-formaldehyde novolak, alkylresorcinol-formaldehyde novolak, alkyl-resorcinol-resorcinol-formaldehyde novolak, aralkylresorcinol-resorcinol-formaldehyde novolak, or mixtures thereof.

13. The vulcanizable rubber composition of claim 1, wherein the phenolic novolak resin is obtained by reacting one or more phenolic compounds represented by formula (A) with one or more aldehyde or ketone compounds:

(A)

wherein $R_1$, $R_2$, $R_3$, $R_4$ and $R_5$ represent independently an organic group selected from hydrogen, hydroxyl, an alkyl having 1 to 15 carbon atoms, an aralkyl having 8 to 12 carbon atoms, halogen or an amino group.

14. The vulcanizable rubber composition of claim 1, wherein the phenolic compound is a phenol, alkyl substituted phenol, or aralkyl substituted phenol.

15. The vulcanizable rubber composition of claim 1, wherein the phenolic compound is a mixture of phenol and alkyl or aryl substituted phenol.

16. The vulcanizable rubber composition of claim 1, wherein the phenolic compound is a resorcinol or alkyl substituted resorcinol or an aralkyl substituted resorcinol.

17. The vulcanizable rubber composition of claim 1, wherein the phenolic compound is a mixture of resorcinol and alkyl or aryl substituted resorcinol.

18. The vulcanizable rubber composition of claim 1, wherein the phenolic compound is a mixture of two compounds: the first compound is selected from phenol or alkyl substituted phenol; the second compound is selected from resorcinol or alkyl substituted resorcinol or an aralkyl substituted resorcinol.

19. The vulcanizable rubber composition of claim 1, wherein the phenolic compound is phenol, o-cresol, m-cresol, p-cresol, o-phenylphenol, p-phenylphenol, 3,5-xylenol, 3,4-xylenol, 3-ethylphenol, 3,5-diethylphenol, p-butylphenol, 3,5-dibutylphenol, p-amylphenol, p-cyclohexylphenol, p-octylphenol, p-nonylphenol, styrylphenol, 3,5-dicyclohexyl-phenol, p-crotylphenol, 3,5-dimethoxyphenol, 3,4,5-trimethoxyphenol, p-ethoxyphenol, p-butoxyphenol, 3-methyl-4-methoxyphenol, p-phenoxyphenol, aminophenol, or mixtures thereof.

20. The vulcanizable rubber composition of claim 1, wherein the phenolic compound is resorcinol, 5-methylresorcinol, 5-ethylresorcinol, 5-propylresorcinol, 2-methyl-resorcinol, 4-methylresorcinol, 4-ethylresorcinol, 4-propylresorcinol, styrylresorcinol, or mixtures thereof.

21. The vulcanizable rubber composition of claim 1, wherein the phenolic compound is phloroglucinol, pyrogallol, cashew nut shell liquid, or mixtures thereof.

22. The vulcanizable rubber composition of claim 1, wherein the aldehyde is formaldehyde, acetaldehyde, propionaldehyde, butyraldehyde, iso-butyraldehyde, n-valeraldehyde, benzaldehyde, crotonaldehyde, cinnamaldehyde, or mixtures thereof.

23. The vulcanizable rubber composition of claim 1, wherein the silane is represented by Formula (C):

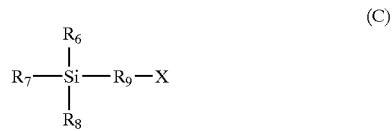

(C)

wherein $R_6$, $R_7$ and $R_8$ are independently an alkyl group of 1 to 4 carbon atoms, an alkoxy group of 1 to 8 carbon atoms, phenyl group, cycloalkyl group; $R_9$ is a divalent saturated or unsaturated aliphatic straight or branched hydrocarbon group with 1 to 12 carbon atoms; X is a thiol, amino, isocyanato, urea or glycidylether group.

24. The vulcanizable rubber composition of claim 1, wherein the silane is 3-(aminopropyl)-triethoxysilane, 3-(isocyanatopropyl)triethoxysilane, 3-(glycidyloxypropyl)trimethoxysilane, 3-(mercaptopropyl)trimethoxysilane, N-beta-aminoethyl-3-(aminopropyl)trimethoxysilane, 3-(aminopropyl)trimethoxysilane, 3-(aminoethyl)triethoxysilane, 3-(glycidyloxyethyl)-triethoxysilane, 3-(mercaptopropyl)triethoxysilane, N-beta-aminoethyl-3-(aminoethyl)-trimethoxysilane, 3-(aminobutyl)triethoxysilane, (aminoethyl)trimethoxysilane, 3-(aminopropyl)methyl-diethoxysilane, N-(3-(triethoxysilyl)propyl) urea, or mixtures thereof.

25. The vulcanizable rubber composition of claim 1, wherein the silane is represented by Formula (D):

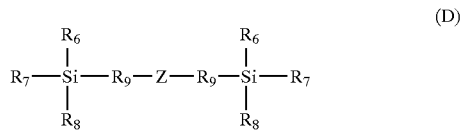

(D)

wherein $R_6$, $R_7$ and $R_8$ are independently an alkyl group of 1 to 4 carbon atoms, an alkoxy group of 1 to 8 carbon atoms, phenyl group, cycloalkyl group; $R_9$ is a divalent saturated or unsaturated aliphatic straight or branched hydrocarbon group with 1 to 12 carbon atoms; Z is $S_x$ or a NH group wherein x is 1, 2, 3, 4, 5, 6, 7, or 8.

26. The vulcanizable rubber composition of claim 1, wherein the silane is a bis-silyl polysulfur silane.

27. The vulcanizable rubber composition of claim 26, wherein the bis-silyl polysulfur silane is 3,3'-bis(trimethoxysilylpropyl)disulfide, 3,3'-bis(triethoxysilylpropyl)tetrasulfide, 3,3'-bis(trimethoxysilylpropyl)tetrasulfide, 2,2'.bis(triethoxysilylethyl)tetrasulfide, 3,3'-bis(trimethoxysilylpropyl)trisulfide, 3,3'-bis(triethoxysilylpropyl)trisulfide, 3,3'-bis(trimethoxysilylpropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, bis-silyl aminosilanes, or mixtures thereof.

28. The vulcanizable rubber composition of claim 1, wherein the silane is represented by Formula (E):

(E)

wherein $R_6$, $R_7$ and $R_8$ are independently an alkyl group of 1 to 4 carbon atoms, an alkoxy group of 1 to 8 carbon atoms, phenyl group, cycloalkyl group, and $R_{10}$ is a vinyl group or an alkoxy group.

29. The vulcanizable rubber composition of claim 1, wherein the silane is vinylmethyldiethoxysilane, vinylmethyldimethoxysilane, vinyltriethoxysilane, vinyltributoxysilane, vinyltriisopropoxysilane, vinyltriisopropenoxysilane, vinyltrimethoxysilane, vinyltriphenoxysilane, vinyltris(2-methoxyethoxy)silane, vinyldimethylethoxysilane, or mixtures thereof.

30. The vulcanizable rubber composition of claim 1, wherein the reaction to make the phenolic novolak resin further comprises a vinyl aromatic compound.

31. The vulcanizable rubber composition of claim 30, wherein the vinyl aromatic compound is represented by $R_{11}$—CH═CH$_2$, wherein $R_{11}$ is phenyl or substituted phenyl.

32. The vulcanizable rubber composition of claim 30, wherein the vinyl aromatic compound is styrene, α-methylstyrene, p-methylstyrene, α-chlorostyrene, divinylbenzene, vinyl-naphthalene, indene, or vinyltoluene.

33. The vulcanizable rubber composition of claim 1, wherein the silane-modified phenolic resin is not further hydrolyzed.

34. The vulcanizable rubber composition of claim 1, wherein the ratio of the number of equivalents of alkoxy groups in the silane compound to the number of equivalents of phenolic hydroxyl groups in the phenolic novolak resin is less than 1.

35. The vulcanizable rubber composition of claim 1, wherein the ratio of the number of equivalents of alkoxy groups in the silane compound to the number of equivalents of phenolic hydroxyl groups in the phenolic novolak resin is less than 0.1.

36. The vulcanizable rubber composition of claim 1, wherein the ratio of the number of equivalents of alkoxy groups in the silane compound to the number of equivalents of phenolic hydroxyl groups in the phenolic novolak resin is less than 0.01.

* * * * *